Sept. 5, 1933.  J. E. MITCHELL  1,925,813
COTTON FEEDING MECHANISM
Filed June 5, 1931

INVENTOR:
JOHN E. MITCHELL
By Bruce S. Elliott
ATTORNEY.

Patented Sept. 5, 1933

1,925,813

UNITED STATES PATENT OFFICE 1,925,813

COTTON FEEDING MECHANISM

John E. Mitchell, Dallas, Tex.

Application June 5, 1931. Serial No. 542,313

8 Claims. (Cl. 19—67)

This invention relates to the provision of novel means for protecting the mechanism of cotton cleaning, extracting, and ginning machines against damage from foreign bodies or articles which are frequently fed into the machines along with the seed cotton.

In the modern ginning of cotton, it is the general practice for each ginning machine to have mounted on it a cotton extracting and cleaning machine, and these combined machines are arranged in a row, and the cotton drawn from the wagons or other source of supply is distributed by any suitable means, either pneumatic or mechanical, to the various cleaning and extracting machines in succession, the refuse being discharged from the cleaning machines, and the extracted cotton delivered to the gin below.

In certain parts of this country cotton is roughly harvested, that is, by means of machines as distinguished from being hand picked. In gin houses equipped for handling such cotton, a preliminary cleaning machine is frequently introduced into the system in advance of the main line of cleaning, extracting and ginning machinery to remove some of the sand and dirt, as well as stems, sticks, leaves, hulls and other foreign substances from the cotton.

All of the machines that enter into the cleaning, extracting and ginning of cotton contain rotary members, which are subject to injury by engaging foreign bodies or articles passing into the machines with the seed cotton. This is true, particularly, of the saw cylinders of both the extracting machines and the gins, and of the high speed cylinders provided with blades or spikes employed in the cleaning and extracting machines, such as the threshing cylinders of cleaning machines, which force the cotton over screens, and the kicker rolls of extracting machines, which operate to knock back trash, hulls, and the like, from the cotton engaged by the teeth of the saw cylinders.

Roughly harvested cotton always contains a large proportion of stems, leaves, hulls, and sand or dirt, and these foreign materials can be separated from the cotton without injury to the cleaning machinery. But such cotton will also frequently contain rocks, roots, sacks, coats, and other matter in the nature of fabrics, pieces of harness, metal articles, etc., and the velocity and volume of air used in unloading and elevating cotton from wagons is so great, that such foreign substances, when mixed with the cotton, are readily carried by the suction and distributed to the various hoppers over the cleaning, extracting and ginning machines.

Rocks, or other foreign bodies or articles smaller than bolls, can be discharged from some of the extracting machinery; but all hard foreign substances larger than bolls, as well as bags, coats and other articles in the nature of fabrics, can not get out of the machines, and not only cause considerable damage to the working parts, especially to the saws and the high speed cylinders referred to, but also necessitate frequent shut-downs and delays for repairs.

The conventional feeding mechanism for feeding cotton to cleaning, extracting and ginning machines, consists of a pair of fluted rollers geared together, and driven so that the upper portions of the rollers rotate toward each other to compress a body of cotton contained in a hopper above the rollers, the compressed or compacted mass being drawn through between the rollers and picked off beneath by a picker roller rotating at a much higher speed than the feeding rollers.

The difficulty in the use of such mechanism, so far as trapping out foreign matter is concerned, is that by reason of the bulky nature of seed cotton with its foreign matter distributed from wagons to the various hoppers above the cleaning and ginning machines, it is necessary to have the hoppers no less than ten or twelve inches in width, and with a heavy mass of cotton of such thickness, the feeding rollers must be spaced apart far enough to avoid excessive squeezing or compressing in pulling the body of cotton between the rollers and delivering it to the picker roller beneath, and the space between the feeding rollers necessary to facilitate handling the heavy, thick mass of cotton, is wide enough to permit large foreign substances to go through with the body of cotton, and to be delivered by the picker roller into the machinery below.

To avoid this difficulty, and to trap any large foreign bodies or articles, while at the same time, not interfering with the free and continuous feeding of the seed cotton to the machinery below, I have provided two sets of feeding rollers, one above and the other below a relatively small picker roller. The upper pair of fluted rollers are spaced far enough apart to permit feeding through the thick body of cotton extending across the full width of the hopper and without having to compress the cotton excessively. The lower pair of fluted rollers are comparatively close together, and would obviously choke or lock if required to compress a thick body of cotton. Such action, so far as the cotton is concerned, is prevented by the picker roller, as hereinafter explained. In the case of large foreign bodies, however, it is intended that the lower feed rollers should be locked by engagement therewith, and these being driven from a belt, when the rollers are locked the belt will simply slip over its pulley and further feed of cotton to the machinery will be stopped until the foreign body has been removed.

In addition to cooperating with both sets of feeding rollers in the feed of the cotton, the interposed relatively small picker roller is intended also to have the function of removing materials in the nature of fabrics, such as coats, sacks and the like, or stringy substances such as rope or pieces of harness, from the cotton. By reason of the relatively small diameter of the picker roller, such soft, stringy substances will be engaged by its spikes and wrapped around the roller, whence they may be readily removed through a door-opening provided for the purpose, by shutting off the feeder.

My invention is illustrated in the accompanying drawing, in which:—

Figure 1:
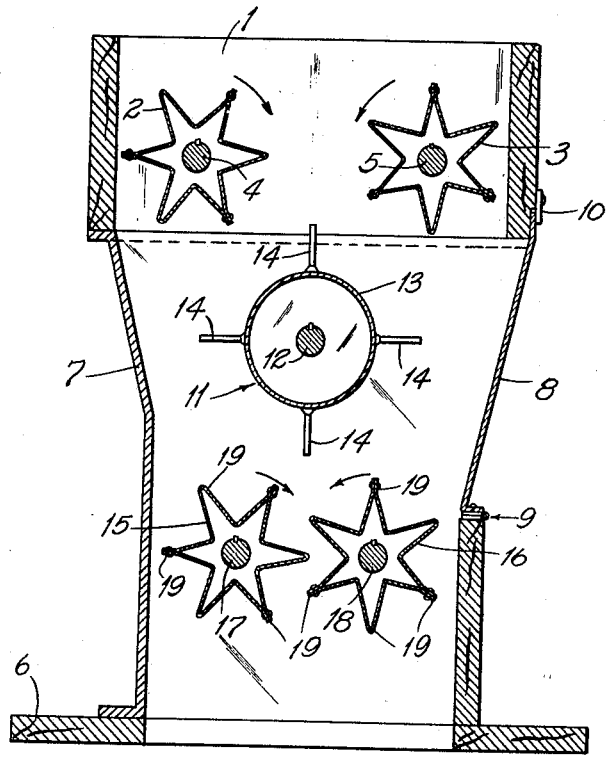
Figure 1 is a vertical sectional view of my improved feeder.

Referring now to the drawing, the numeral 1 indicates the hopper of my improved feeder into which cotton drawn from the wagons is adapted to be fed by conventional distributing mechanism. Mounted near the lower end of this hopper are two fluted, or star-shaped, feeding rollers 2, 3, mounted, respectively, on shafts 4, 5. These feeding rollers, as shown by the arrows, rotate in a direction toward each other as respects their upper portions, and they are spaced far enough apart to draw between them a mass of cotton ten or twelve inches in thickness without exerting an excessive squeezing or compressing action thereon. Secured on the lower end of hopper 1, and extending down and secured to the base 6 of the feeder, is a metallic casing 7, which is provided at one side with a door 8, hinged at 9, and normally held closed by a turn-button 10, at its upper end. Positioned within the casing 7 immediately below the feeding rollers 2, 3, is a picker roller 11 having a shaft 12 mounted centrally between the shafts 4 and 5 of the feeding rollers.

The picker roller 11 comprises a relatively small drum 13 provided around its periphery with several rows of spikes 14 spaced two or three inches apart and extending the entire length of the drum. Located near the bottom of the casing 7 is a second pair of feeding rollers 15, 16, mounted, respectively, on shafts 17, 18, and arranged to rotate, as indicated by the arrows, in a direction toward each other as respects their upper portions. These rollers are for the purpose of trapping large, hard bodies contained in the cotton, and to this end are located much nearer to each other than the upper set of feeding rollers 2, 3; and in practice, the outer ends of their flutes 19 travel in circular paths which slightly overlap. In other words, in rotation, the flutes interlock, but, of course, are out of engagement with each other, each flute of one roller occupying in its horizontal position a position midway between two flutes of the adjacent roller.

Figure 2:
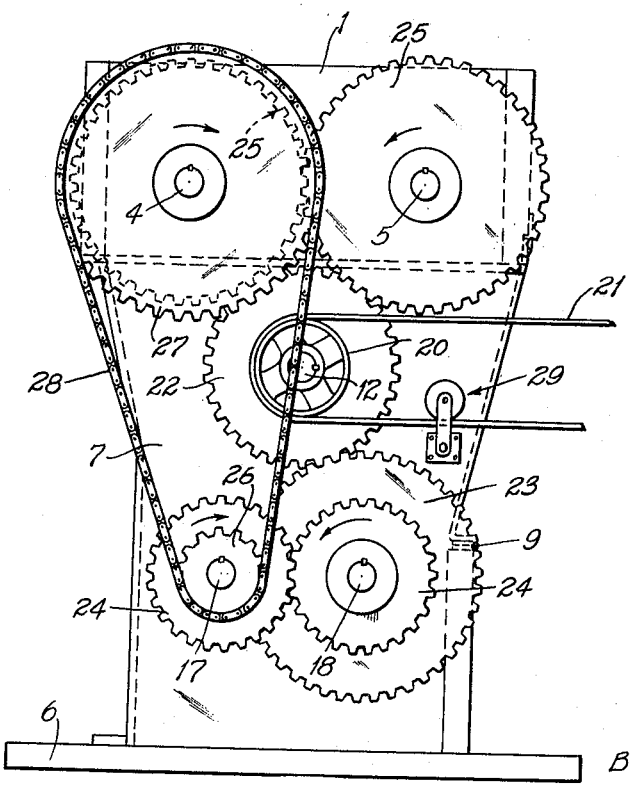
Figure 2 is a view of one side of the machine showing the driving mechanism, to illustrate the relative speeds of rotation of the two sets of feed rollers and the picker roller.

In order to illustrate the relative speeds of rotation of the upper and lower sets of feeding rollers and the picker roller, I will now describe the driving mechanism for these parts, referring to Figure 2.

Mounted on the end of the picker roller shaft 12 is a pulley 20, which is driven by a belt 21 from a suitable source of power (not shown). Mounted on shaft 12 is also a pinion 22 which meshes with a gear 23 on shaft 18 of one of the lower feeding rollers. Each of shafts 17 and 18 of these lower feeding rollers has mounted on its end a gear 24, said gears being of the same diameter and intermeshing, so that when shaft 18 is driven by means of pinion 22 and gear 23 the feeding or trapping rollers 15, 16, will be rotated toward each other in their upper portions, as indicated by the arrows. The shafts 4 and 5 of the upper feeding rollers are correspondingly geared together to rotate at the same rate of speed by means of intermeshing gears 25 of the same diameter mounted, respectively, on the end of each shaft. To drive the upper set of feed rollers, I mount on shaft 17 a sprocket 26, which, in practice, may be 2½ inches in diameter. On the shaft 4 of one of the upper feed rollers, I mount a sprocket wheel 27 which is approximately three times the diameter of the sprocket wheel 26, or 7½ inches in diameter. These sprocket wheels are connected by a sprocket chain 28.

With power applied to belt 21, shaft 12 and consequently the picker roll 13 will be rotated by pulley 20 and the lower trapping rollers 15 and 16 will be driven at a slower rate of speed by means of engagement of pinion 22 with gear 23 and of the two gears 24 on the shafts 17 and 18 of said rollers. The upper set of feed rollers 2, 3, will be driven at a slower rate of speed than the lower set of trapping rollers by means of the larger sprocket 27 being rotated from the smaller sprocket 26 on shaft 17 through the medium of sprocket chain 28. Thus the picker roller will have a higher speed of rotation than either of the two sets of feeding rollers, and the lower set of feeding, or trapping rollers, will have a higher speed of rotation than the upper set of feeding rollers. In practice, the drive belt 21 is arranged to be driven at variable speeds to regulate or change the quantity of cotton being fed into the machinery below. This may be done with the use of step-cone pulleys; but as this is common practice, and does not enter into my invention, I have not thought it necessary to further illustrate the arrangement for driving the mechanism, as, whatever the speed selected, the feeding rollers, trapping rollers, and picker roller will have the relative speeds of rotation indicated.

It is necessary, however, to have a belt tightener for the belt 21 in order to permit the feeding mechanism to be started or stopped independently of the operation of the machinery below. I have, therefore, shown a conventional belt tightener and indicated the same generally by the numeral 29.

The small picker roller or cylinder 13, rotating between the two sets of feeding rollers, or feeding and trapping rollers, performs important functions, which I will now describe.

As stated, the picker roller rotates considerably faster than either the feeding rollers or the trapping rollers, and during the upper half of the rotation, the spikes 14 thereon engage and pick off the locks of cotton from the mass being forced downward between feeding rollers 2, 3; while the same spikes, during the lower half of the revolution, will relieve the lower pair of feeding or trapping rollers of any excess cotton which may be delivered to them.

To further explain this operation, it may be stated that while the hopper above the upper pair of feeding rollers is kept filled and a uniform or normal stream is being fed through to the picker roller, the cotton will be picked off from the mass in one or more locks at a time and delivered at greater speed, but in a lighter and thinner stream, to the trapping rollers below, so that the latter will carry through and discharge the normal or regular stream as fast as it is delivered to them by the picker roller, and without any of it being carried around by the picker roller.

There is a variation from this operation, however, both when the hoppers are being first filled and when they start to run empty. When the hoppers are emptied after each wagon load is ginned, there is a mass of cotton that falls through between the upper pair of feeding rollers, and if it were permitted to fall directly onto the trapping rollers below, with their comparatively close setting and higher speed, they would instantly choke or lock; and obviously it is desirable to have all of the choking or locking due to foreign substances and not to the handling of the cotton itself.

The same thing happens when the hoppers are first filled. Due to the wide gap between the rollers 2, 3, in the initial filling operation there will be enough cotton drop through the space between the rollers which, if permitted to fall directly onto the trapping rollers below, would jam or choke them.

In both cases, the excessive load which comes through the upper feeding rollers is delivered to the trapping rollers below by the rapidly revolving picker roller, which prevents the cotton from jamming or choking the lower pair of rollers by carrying over them and around any excess quantity of cotton, and redelivering it back to the rollers so that they can quickly get rid of it in a thin, rapidly-moving stream.

As to foreign substances, which it is the object of my invention to trap and prevent from getting into the machinery below, any soft, fabric like or stringy foreign substances, such as rope, harness, bags, coats, and the like, will be engaged by the spikes 14 of the picker roller and caused to wrap around the same due to the comparatively small diameter of said roller.

All hard foreign substances, such as rocks, stones, pieces of metal, and the like, large enough to cause serious damage to the saw cylinders and other moving parts of the cleaning and ginning machinery below, cannot pass between the trapping rollers and will therefore cause the same to be locked. This stops the operation of the feeding mechanism, as the shaft 12 of the picker roller cannot rotate, and the drive belt 21 will simply slip on the pulley 12.

To remove foreign substances, either wrapped around the picker roller, or caught between the trapping rollers below it, the button 10 is turned out of engagement with door 18, which may then be lowered, and it is a simple matter, with a little reverse motion of the rollers to remove such foreign body or article.

From the foregoing, it will be seen that the upper pair of rollers rotate at a comparatively low speed on a thick body of cotton, while the lower pair of rollers rotate at a comparatively high speed on a thin body of cotton. The upper pair of rollers is caused to regulate the stream of cotton going to the cleaning and ginning machinery below. The lower pair of rollers serves no other purpose than to lock on any hard foreign substances and shut off or stop the feed, until such foreign substance is removed.

While my invention, in its preferred embodiment, is as illustrated in the drawing and herein described, it is obvious that, broadly considered, it is not limited to the use of supplemental feeding or trapping rollers for preventing the feed of hard objects to the cleaning machinery below, but that the generic concept of the invention in this regard resides in providing a supplemental feeding mechanism which affords a passage through it of such restricted size that hard bodies larger than cotton bolls fed into the machine with the cotton cannot pass through such passage, and will be trapped in such supplemental feeding mechanism; and, in addition, in providing a common drive for all of the members of the feeder so that when the supplemental feeding mechanism is stopped by engaging a foreign body, the feed of the cotton will be stopped until the foreign object is removed.

I claim:—

1. Cotton feeding mechanism for cotton cleaning and extracting machines comprising, in combination, a pair of relatively widely-spaced main feeding rollers for delivering cotton to be cleaned from a source of supply, supplemental feeding rollers positioned below said main feeding rollers and located sufficiently close to each other to prevent the passage between them to the cotton cleaning mechanism of hard objects larger than cotton bolls, and driving mechanism common to said main and supplemental feeding rollers, whereby, when a hard object larger than a cotton boll is engaged by said supplemental feeding rollers they will be locked and stop the feed of the cotton.

2. Cotton feeding mechanism comprising, in combination, a pair of relatively widely spaced feeding rollers, a picker roller located beneath and in cooperative relation to said feeding rollers, and supplemental feed mechanism located below said picker roller and having its feed controlled thereby, said latter mechanism affording a passage for the feed of the cotton of such restricted size that foreign objects contained in the cotton of greater size than the cotton bolls will be trapped in said passage and prevented from passing through with the cotton.

3. Cotton feeding mechanism comprising, in combination, a pair of feeding rollers, a picker roller located beneath said feeding rollers, supplemental feeding mechanism located below said picker roller, driving mechanism common to said feeding rollers, picker rollers and supplemental feeding mechanism, said supplemental feeding mechanism affording a passage for the cotton of such restricted size that a hard object larger than a cotton boll contained in the cotton will operate to lock said supplemental feeding mechanism and stop the feed of the cotton.

4. Cotton feeding mechanism comprising, in combination, a pair of main feeding rollers for delivering cotton to be cleaned from a source of supply, a picker roller located beneath said feeding rollers, supplemental feeding rollers positioned beneath said picker roller, and located sufficiently close to each other to prevent the passage between them of hard objects larger than cotton bolls, and driving mechanism common to all of said rollers, whereby, when a hard object larger than a cotton boll is engaged by said supplemental feeding rollers the latter will be locked and stop the feed of the cotton.

5. Cotton feeding mechanism comprising, in combination, a pair of main feeding rollers for delivering cotton to be cleaned from a source of supply, a picker roller located beneath said feeding rollers, a pair of supplemental feeding rollers positioned beneath said picker roller and located sufficiently close to each other to prevent the passage between them of hard objects larger than cotton bolls, and driving mechanism common to all of said rollers and operating to drive the supplemental feeding rollers at a higher rate of speed than the main feeding rollers and the picker roller at a higher rate of speed than the supplemental feeding rollers, the latter rollers being adapted to be locked when engaging a foreign object larger than a cotton boll and stop the feed of the cotton.

6. Cotton feeding mechanism comprising, in combination, a pair of main feeding rollers for delivering cotton to be cleaned from a source of supply, a pair of supplemental feeding rollers mounted below said main feeding rollers and located sufficiently close to each other to prevent the passage between them of hard objects larger than cotton bolls, a picker roller located below the main feeding rollers and in cooperative relation with the supplemental feeding rollers, and driving mechanism common to all of said rollers, whereby, when a hard object larger than a cotton boll is engaged by said supplemental feeding rollers the latter will be locked and stop the feed of the cotton.

7. Cotton feeding mechanism comprising, in combination, a pair of relatively widely spaced main feeding rollers for delivering cotton to be cleaned from a source of supply, a pair of supplemental feeding rollers mounted below said main feeding rollers and located sufficiently close to each other to prevent the passage between them of hard objects larger than cotton bolls, a relatively small picker roller located beneath said main feeding rollers and above and in cooperative relation with said supplemental feeding rollers, all of said rollers being operatively connected to rotate in unison, and a slip drive for actuating said rollers, whereby, when a hard object larger than a cotton boll is engaged by said supplemental rollers the latter will be locked and stop the feed of the cotton, and the slip drive may continue to operate without injuring the driving connections of said rollers.

8. Cotton feeding mechanism for cotton cleaning and extracting machines comprising, in combination, a pair of relatively widely-spaced main feeding rollers for delivering cotton to be cleaned from a source of supply, a supplemental feeding mechanism cooperating with said main feeding rollers and constructed to prevent the passage through it to the cotton treated mechanism of hard objects larger than cotton bolls, and driving mechanism common to said main and supplemental feeding mechanisms, whereby when a hard object larger than a cotton boll is fed into said supplemental feeding mechanism, the latter will be locked to stop the feed of the cotton.

JOHN E. MITCHELL.